J. B. MASON.
Pulleys or Gear Wheels.

No. 169,114.  Patented Oct. 26, 1875.

WITNESSES.
L. H. Latimer.
W. J. Pratt.

INVENTOR.
John B. Mason
per Crosby Gregory Attys.

UNITED STATES PATENT OFFICE.

JOHN B. MASON, OF QUINCY, ASSIGNOR TO WILLIAM H. L. SMITH, OF BOSTON, MASSACHUSETTS.

IMPROVEMENT IN PULLEYS OR GEAR-WHEELS.

Specification forming part of Letters Patent No. 169,114, dated October 26, 1875; application filed July 15, 1875.

*To all whom it may concern:*

Be it known that I, JOHN B. MASON, of Quincy, in the county of Norfolk and State of Massachusetts, have invented an Improvement in Pulleys or Gear-Wheels, of which the following is a specification:

This invention relates to pulleys or gear-wheels for transmitting power; and consists in the combination of a loose pulley or gear with a support disconnected from the shaft, about which the pulley or gear moves, and adapted to sustain the pulley or gear when disconnected in any way from the shaft and it is desired to have the pulley or gear to cease its movement.

Figure 1:
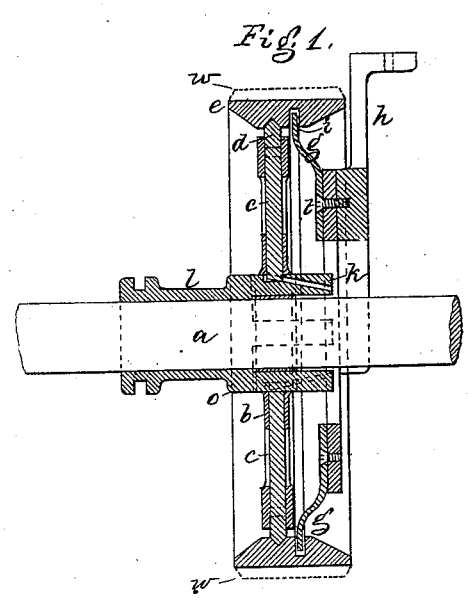
Figure 2:
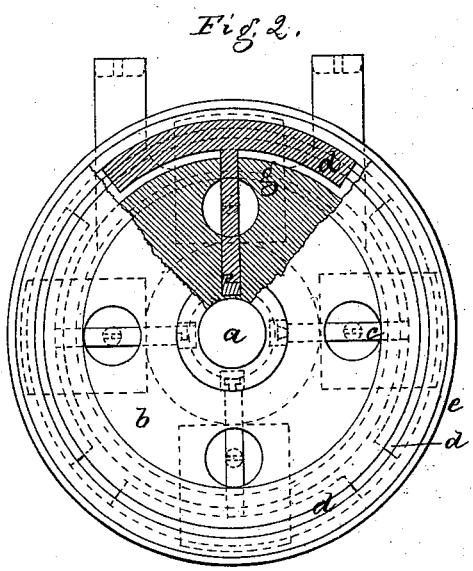
Figure 3:
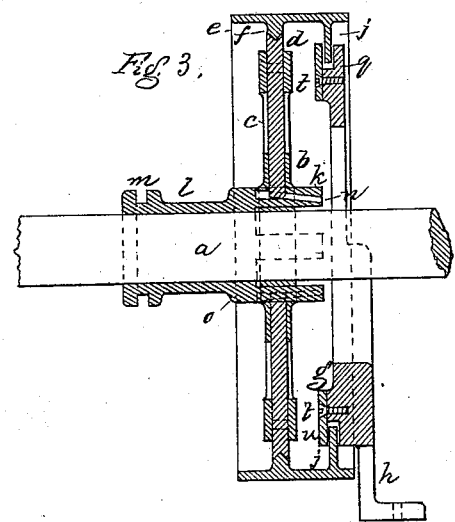
Figure 4:
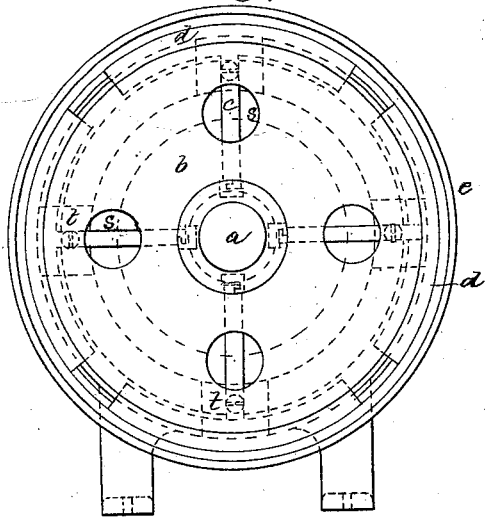
Figure 6:
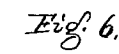
Figure 7:
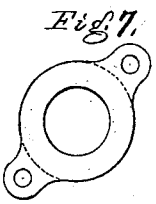
Figure 5:
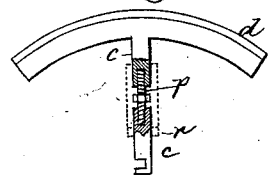

Figure 1 is a section through this improved pulley or gear. Fig. 2 is a face view thereof, partly in section. Fig. 3 is a section of a modified form of pulley; Fig. 4, a face view of Fig. 3; Fig. 5, a modification of clutch-supporting arm, and Figs. 6 and 7 side and end views of a modified form of collar.

The pulley or gear-wheel, with a smooth or usual belt-receiving face, or with teeth, is constructed and combined with the driving-shaft, so that it can be conveniently attached to and detached therefrom while the shaft is in motion, the pulley or gear remaining at rest, and isolated from the shaft, thereby saving friction and wear usually attending the employment of a loose pulley, and also saving the shifting of a belt, or equivalent connector, when it is desired to stop any single machine, or any secondary or intermediate line of shafting, while the main line continues to run, or when it is desired to detach one line of shafting from another for any purpose.

This invention is shown as carried out in the following manner: On a shaft, $a$, in any well-known way, is secured a hub, $b$, which may be made as a disk, as shown in the drawing, or may consist of a hub with arms extending radially therefrom, the arms being connected, preferably, by an exterior rim. In this hub or disk, or in the arms of the hub, I bore or drill holes from the circumference to, or nearly to, the shaft-receiving opening in the hub, and in these holes (two or more, the number varying according to the work to be accomplished by the pulley) are fitted sliding arms $c$, having at their outer ends segmental friction-surfaces $d$, which may be formed with outwardly-inclined faces, as shown at Fig. 1, adapted to enter a correspondingly-shaped groove in the interior of the rim $e$; or the friction-surfaces may have their faces grooved to receive a projecting bead or pin, $f$, (see Fig. 2) on the interior surface of the rim $e$; or the faces of the friction devices $d$ may be made as curves, or otherwise varied, the faces, however, fitting a correspondingly-reversed shape in or from the rim, they thereby preventing motion of the rim in the direction of the length of the driving-shaft. These friction devices, when forced out by moving the arms, engage the rim, and cause it to move with the hub or disk, as though it formed part of the same; and when the arms and friction-surfaces are drawn toward the hub the rim is left unclutched, and is allowed to remain at rest, while the hub or disk and shaft continue to rotate, the rim at this time resting on a support, $g$, (see Figs. 1 and 2,) projecting from a hanger or supporting bracket or bearing, $h$, the support entering a groove, $i$, in the interior of the rim, as in Fig. 1, or the rim $e$ may have a projection, $j$, Fig. 2, to enter a groove in the support $g$. The arms $c$ are shown as operated positively, in both directions, to and from the shaft $a$, by means of grooved pins $k$, one for each arm $c$, and projecting from a collar, $l$, grooved at $m$ to receive a shipper, in the usual manner, the collar being fitted to the shaft $a$, so as to slide longitudinally thereon, and the movement of the collar $l$ laterally away from the hub is regulated so that the collar cannot in its regular movement move so far as to withdraw the pins from contact with the arms. These pins $k$ have grooves $n$, made with inclined or curved faces, commencing at the outer ends of the pins, and extending nearly to the portion $o$ of the collar, and then, for a short distance, the faces of the grooves are, preferably, less inclined, and nearly parallel with the shaft $b$, and this is to furnish the ends or shoes of the arms $c$ with a nearly-horizontal resting-surface, so as to thereby overcome any tendency of the parts to move laterally when it is not desired for them to so move.

The inner ends of the arms c are fashioned to fit the grooves in the pins k, and may be formed as dovetails, or may be of T or L shape, as shown in Figs. 2 and 4, so that, as the pins are moved laterally by the collar l, the inclined or curved grooves therein, acting on the shoes or hooks of the arms, will move them in either direction, so as to clutch or disengage the friction-surfaces with or from the rim, and to hold them in either of these positions, and the amount of friction between the friction devices and the rim may be more or less.

It is evident that the pins may be made as wedges, and be adapted to enter slots in the lower ends of the arms. These arms, or the devices for moving the friction-surfaces out or in, may be changed, or otherwise formed, and, instead thereof, any devices now known may be used to move the friction devices to or from the shaft a, to engage or disengage the rim. These arms, instead of being made in one piece, preferably, should be made in two parts, (see Fig. 5,) and be provided with a right-and-left-threaded screw, p, or collar, (shown in dotted lines, Fig. 5,) fitted to screw-threads on the outsides of the arms c, this provision permitting the arms and friction devices to be adjusted to the desired position; and I provide a set-nut, r, (dotted lines, Fig. 5,) to confine the arms in adjusted position.

When the collar and pins k are drawn out, and the arms c are drawn toward the shaft, removing the friction devices d from actuating contact with the rim e, the rim is left loose, and is permitted to fall a little from its previous position, so as to be supported by the support g, and in this position the shaft a and hub b continue to rotate, the rim remains at rest with its belt, and the rim so supported cannot move laterally with relation to the shaft; but when the rim is elevated by the action of the arms and friction-surfaces, or picked up off from the support, and made to operate as a driver, then the rim does not touch the support, and there is no friction between them.

The hub or disk b is shown as provided with openings s, to permit the introduction of a screw-driver to the screws t, (shown in dotted lines, Figs. 2 and 4, and in section in Figs. 1 and 3,) such screws holding the support g, Fig. 1, in position, or retaining the plate u, Fig. 3, in position. These holes or openings s are also useful to permit the arms c to be adjusted when two-part arms are used, as in Fig. 5; but, instead of the circular openings, the openings may be made as segmental slots, or the disk b may be otherwise cut away to make it light and afford access to parts behind it.

The rim, instead of being adapted to receive a belt, may be cogged or provided with teeth w, as shown in dotted lines, Fig. 1, to engage other toothed wheels or gear, and these teeth may be of any well-known shape.

Instead of the supports shown in Figs. 1 and 3, and extended about, but not carried by, the shaft, and within the rim, I may employ any other equivalent support capable of suspending the rim out of contact with the hub or shaft, substantially concentric with the shaft, while the hub or shaft rotates.

Instead of having only the rim e as the part which may be held at rest while the shaft rotates, I may make the hub or disk smaller in diameter, and extend a plate from the inner portion of the rim to meet the friction-surfaces of the hub or disk.

In some cases it will be desirable to disconnect a pulley from a shaft and suspend it, as before described, and when a clutch would not be required, or the cost thereof be warranted by the exigencies of the work, and in such cases I suspend the pulley, substantially as before described, but disconnect it from the shaft, and reconnect it when at rest, by means of a sleeve or collar (see Figs. 6 and 7) introduced between the shaft and the hub of the pulley which is to be driven, and such sleeve or collar is made of sufficient thickness, so that when removed, and the pulley rests on the supporting-arms, the shaft will not come in contact with the pulley, and such sleeve or collar may be made of any other well-known or suitable form, and be attached to the shaft and pulley, and detached from them, in any of the usual methods of attaching pulleys to shafts—viz., by splines or keys, or set-screws, or bolts and nuts.

I have described in this specification different ways of carrying out this my improvement; but it is evident it may be carried out in other ways without departing from this invention, the gist of which is, disconnecting a pulley or gear from its mover—a hub, disk, or shaft—and placing it at rest on a support disconnected from, or not moving with, the shaft, while the shaft and hub or disk continue to move; and I, therefore, do not desire to limit this invention to the exact form of devices shown and described, and I may use for such devices any known equivalents.

I claim—

1. A pulley or gear adapted to be connected with or disconnected from its driving-shaft or mover, combined with a support, whereby the pulley or gear disconnected from its mover may be held at rest as the mover continues to rotate, substantially as described.

2. The combination of a pulley or gear and a rotating shaft with friction devices moved with the shaft, and adapted to engage a groove in or projection from the interior of the pulley or gear, substantially as described.

3. The combination of a loose pulley or gear, substantially as described, and arms and friction devices d, with pins and a collar adapted to move the arms and friction devices positively in both directions, the ends of the friction devices engaging a portion of the interior of the pulley, and by friction between the ends of the friction devices and pulley moving the pulley, substantially as described.

4. The hanger or standard h and pulley-support, combined with the rim of the loose pulley, substantially as described, whereby the pulley is supported, and the rim and support are prevented from moving laterally, substantially as described.

5. The combination of the shaft, collar, hub, friction devices, pins for actuating the arms of the friction devices, and loose rim or pulley, with a stationary support for the rim when released from the driving-shaft, all substantially as described.

In testimony whereof I have signed my name to this specification in the presence of two subscribing witnesses.

JOHN B. MASON.

Witnesses:
  G. W. GREGORY,
  S. B. KIDDER.